(12) United States Patent
Kowalski

(10) Patent No.: US 8,428,178 B2
(45) Date of Patent: Apr. 23, 2013

(54) SYSTEMS AND METHODS FOR DESIGNING A SEQUENCE FOR CODE MODULATION OF DATA AND CHANNEL ESTIMATION

(75) Inventor: John M. Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 683 days.

(21) Appl. No.: 12/664,367

(22) PCT Filed: Jun. 13, 2008

(86) PCT No.: PCT/JP2008/061286
§ 371 (c)(1),
(2), (4) Date: Dec. 11, 2009

(87) PCT Pub. No.: WO2008/153218
PCT Pub. Date: Dec. 18, 2008

(65) Prior Publication Data
US 2010/0172439 A1    Jul. 8, 2010

(51) Int. Cl.
*H04K 1/02* (2006.01)
(52) U.S. Cl.
USPC ............ 375/296; 375/295; 370/342; 370/344
(58) Field of Classification Search ................ 375/296, 375/260; 370/342, 344
See application file for complete search history.

(56) References Cited

U.S. PATENT DOCUMENTS

| | | | |
|---|---|---|---|
| 7,145,940 B2 | 12/2006 | Gore et al. | |
| 7,170,926 B2 | 1/2007 | Zeira | |
| 7,173,899 B1 | 2/2007 | Rupp | |
| 7,173,973 B2 | 2/2007 | Borran et al. | |
| 7,539,263 B2 | 5/2009 | Jung et al. | |
| 7,848,448 B2 | 12/2010 | Han et al. | |
| 2002/0141367 A1 | 10/2002 | Hwang et al. | |
| 2003/0086363 A1 | 5/2003 | Hernandez | |
| 2004/0081074 A1 | 4/2004 | Piechocki | |
| 2004/0146024 A1 | 7/2004 | Li et al. | |
| 2004/0213326 A1 | 10/2004 | Parizhsky et al. | |
| 2005/0201477 A1 | 9/2005 | Cho et al. | |
| 2006/0239336 A1 | 10/2006 | Baraniuk et al. | |
| 2006/0247898 A1 | 11/2006 | Cha | |
| 2006/0274710 A1* | 12/2006 | Lim et al. ...................... | 370/342 |
| 2007/0006794 A1 | 1/2007 | Swenson et al. | |

(Continued)

FOREIGN PATENT DOCUMENTS

| AU | 759855 | 11/2002 |
|---|---|---|
| AU | 3139502 | 11/2002 |

(Continued)

OTHER PUBLICATIONS

Office Action issued for U.S. Appl. No. 11/686,251 on Feb. 3, 2012.

(Continued)

*Primary Examiner* — Eva Puente
(74) *Attorney, Agent, or Firm* — Austin Rapp & Hardman

(57) ABSTRACT

A method for using a numerical method to design a sequence for code modulating data is described. An input multiple input multiple output signal is determined. A nearest tight frame to one or more given structured vectors is obtained. One or more structured vectors is obtained from the nearest tight frame. The one or more structured vectors is projected onto the space of circulant matrices. One or more classes of matrices that indicates the design of the sequence is outputted. Data is code modulated using the designed sequence.

8 Claims, 10 Drawing Sheets

U.S. PATENT DOCUMENTS

| | | | |
|---|---|---|---|
| 2007/0183386 | A1* | 8/2007 | Muharemovic et al. ...... 370/344 |
| 2007/0230600 | A1 | 10/2007 | Bertrand et al. |
| 2007/0253476 | A1 | 11/2007 | Tirkkonen et al. |
| 2007/0297381 | A1 | 12/2007 | Oketani et al. |
| 2008/0075184 | A1 | 3/2008 | Muharemovic et al. |
| 2008/0129560 | A1 | 6/2008 | Baraniuk et al. |
| 2008/0159436 | A1 | 7/2008 | Cho et al. |
| 2008/0225688 | A1 | 9/2008 | Kowalski |
| 2008/0232300 | A1 | 9/2008 | McCoy et al. |
| 2008/0235314 | A1 | 9/2008 | Lee et al. |
| 2008/0310383 | A1 | 12/2008 | Kowalski |
| 2008/0318528 | A1 | 12/2008 | Hooli et al. |
| 2009/0046629 | A1 | 2/2009 | Jiang et al. |
| 2009/0067318 | A1 | 3/2009 | Kowalski |
| 2009/0110034 | A1 | 4/2009 | Kowalski |
| 2009/0123048 | A1 | 5/2009 | Leroux et al. |
| 2009/0135791 | A1 | 5/2009 | Kawamura et al. |
| 2010/0097922 | A1 | 4/2010 | Kowalski |
| 2010/0177834 | A1 | 7/2010 | Kowalski |
| 2010/0195566 | A1 | 8/2010 | Krishnamurthy et al. |
| 2010/0272192 | A1 | 10/2010 | Varadarajan et al. |
| 2010/0290546 | A1 | 11/2010 | Kowalski |
| 2011/0149716 | A1 | 6/2011 | Cho et al. |

FOREIGN PATENT DOCUMENTS

| | | |
|---|---|---|
| CA | 2 611 157 A1 | 12/2006 |
| CA | 2380039 | 10/2008 |
| CN | 1380765 | 11/2002 |
| CN | 1930844 A | 3/2007 |
| DE | 60209392 | 8/2006 |
| DE | 20221616 | 10/2006 |
| EP | 1248485 | 10/2002 |
| EP | 1 898 542 A1 | 3/2008 |
| JP | 2002-369258 | 12/2002 |
| JP | 2006-203945 | 8/2006 |
| JP | 2006-295629 | 10/2006 |
| JP | 2007-89108 | 4/2007 |
| KR | 10-2002-0079453 | 10/2002 |
| WO | 2006/134949 | 12/2006 |
| WO | 2007/023767 | 3/2007 |

OTHER PUBLICATIONS

Office Action issued for U.S. Appl. No. 11/764,061 on Dec. 7, 2011.
Office Action issued for U.S. Appl. No. 11/928,092 on Feb. 17, 2012.
Texas Instruments, "Design of CAZAC Sequences for Small RB Allocations in E-UTRA UL," R1-072206, May 2007.
Dilip Sarwate, "Bounds on Crosscorrelation and Autocorrelation of Sequences," IEEE trans. Information Theory, vol. IT-25, No. 6, Nov. 1979, pp. 720-724.
Sharp, "Optimized UL RS Design, and some issues with current UL RS proposals," R1-071494, Mar. 2007.
Sharp, "Optimized UL RS Design—OZCL Sequences," R1-072053, May 2007.
Texas Instruments, "ACK/NAK and CQI Multiplexing Capacity and Performance in E-UTRA UL," R1-072210, May 2007.
Draft Report of 3GPP TSG RAN WG1 #40 v0.3.0m Jun. 2007.
International Search Report issued for International Patent Application No. PCT/JP2008/061286 on Aug. 19, 2008.
International Preliminary Report on Patentability issued for International Patent Application No. PCT/JP2008/061286 on May 22, 2009.
U.S. Appl. No. 11/928,092, filed Oct. 30, 2007, Kowalski.
U.S. Appl. No. 11/686,251, filed Mar. 14, 2007, Kowalski.
U.S. Appl. No. 12/530,761, filed Sep. 10, 2009, Kowalski.
U.S. Appl. No. 12/530,742, filed Sep. 10, 2009, Kowalski.
U.S. Appl. No. 11/764,061, filed Jun. 15, 2007, Kowalski.
Sharp, "Summary Results on OZCL Sequences for UL RS for LTE," 3GPP TSG-RAN WG1 #50, R1-073319, Aug. 2007.
J. Coon et al., "Optimal Training Sequences for Channel Estimation in Cyclic-Prefix-Based Single-Carrier Systems with Transmit Diversity," IEEE Signal Processing Letters, vol. 11, No. 9, Sep. 2004, pp. 729-732.
L.R. Welch, "Lower Bounds on the Maximum Cross-Correlation of Signals," IEEE Transactions on Information Theory, vol. IT-20, No. 3, May 1974, pp. 397-399.
B. Popovic, "Generalized Chirp-Like Polyphase Sequences with Optimum Correlation Properties," IEEE Transactions on Information Theory, vol. 38, No. 4, Jul. 1992, pp. 1406-1409.
S. Boyd and L. Vandenberghe, "Convex Optimization", 2004, p. 634, Cambridge University Press, Cambridge.
R.M. Gray, "Toeplitz and Circulant Matrices: A Review," http://ee.stanford.edu/~gray/toeplitz.pdf, Jun. 28, 2007.
Motorola, "Uplink Reference Signal Generation Methods," 3GPP RAN WG1 #47bis, R1-070152, Jan. 2007.
NEC Group, "Citeria to decide Zadoff-Chu sequence length for EUTRA uplink reference signal," 3GPP TSG RAN WG1 Meeting #48, R1-070877, Feb. 2007.
Motorola, "Cubic Metric in 3GPP-LTE," 3GPP TSG RAN WG1 LTE Adhoc, R1-060023, Jan. 2006.
Motorola, "Proposal for UL DM RS for 1 and 2 RB Allocation," 3GPP TSG RAN1 Email Reflector, Sep. 2007.
Qualcomm Europe, "Uplink RS for Small Resource Block Allocation," 3GPP TSG RAN1 #50, R1-07xxxx, Aug. 2007.
Texas Instruments, "Design of CG Sequences for Small RB Allocations in E-UTRA UL," 3GPP TSG RAN WG1 #50bis, R1-07abcd, Oct. 2007.
Texas Instruments, "Design of CAZAC Sequences for Small RB Allocations in E-UTRA UL," 3GPP RAN WG1 #49bis, R1-072848, Jun. 2007.
Motorola, "UL RS Generation for E-UTRA," 3GPP RAN WG1 #50, R1-073754, Aug. 2007.
Y. Linde, A. Buzo, and R.M. Gray, "An Algorithm for Vector Quantizer Design," IEEE Trans. Commun. vol. Com-28, No. 1, Jan. 1980, pp. 84-98.
P. Xia, S. Zhou, G. Giannakis, "Achieving the Welch Bound with Different Sets," IEEE Trans. Information Theory, vol. 51, No. 5, May 2005, pp. 1900-1907.
Sharp, "UL RS via OZCL Sequences," 3GPP TSG-RAN WG1 #49bis, R1-072719, Jun. 25, 2007.
Joel A. Tropp et al., "Designing Structured Tight Frames Via an Alternating Projection Method," IEEE Transactions on Information Theory, vol. 51, No. 1, pp. 188-209, Jan. 2005.
J.A. Tropp et al., "Applications of Sparse Approximation in Communications," IEEE Transactions on Information Theory, ISIT 2005, Proceedings. International Symposium on Sep. 9, 2005, pp. 1000-1004.
J.A. Tropp et al., "Simultaneous Sparse Approximation via Greedy Pursuit," IEEE Transactions on Information Theory, ISIT 2005, Proceedings. International Symposium, pp. 721-724.
International Search Report issued for International Patent Application No. PCT/JP2008/055157 on May 20, 2008.
Written Opinion issued for International Patent Application No. PCT/JP2008/055157on May 20, 2008.
International Search Report issued for International Patent Application No. PCT/JP2008/055154 on Jun. 24, 2008.
Written Opinion issued for International Patent Application No. PCT/JP2008/055154 on Jun. 24, 2008.
International Search Report issued for International Patent Application No. PCT/JP2008/066481 on Dec. 22, 2008.
Notice of Allowance issued for U.S. Appl. No. 11/851,077 on Jan. 25, 2011.
Office Action issued for U.S. Appl. No. 11/928,092 on Mar. 4, 2011.
Notice of Allowance issued for U.S. Appl. No. 11/851,077 on Apr. 29, 2011.
Notice of Acceptance issued for Australian Patent Application No. 2008227399 on May 2, 2011.
Office Action issued for U.S. Appl. No. 11/686,251 on Aug. 19, 2011.
Office Action issued for U.S. Appl. No. 11/928,092 on Sep. 2, 2011.
Notice of Allowance issued for U.S. Appl. No. 12/530,761 on Sep. 30, 2011.
Office Action issued for U.S. Appl. No. 11/764,061 on Mar. 10, 2011.

Office Action issued for U.S. Appl. No. 11/764,061 on Jun. 24, 2011.
Office Action issued for U.S. Appl. No. 11/764,061 on Oct. 4, 2010.
Notice of Allowance issued for U.S. Appl. No. 12/530,742 on Nov. 16, 2011.

Notice of Allowance issued for U.S. Appl. No. 12/530,761 on Nov. 9, 2011.

* cited by examiner

SYSTEMS AND METHODS FOR DESIGNING A SEQUENCE FOR CODE MODULATION OF DATA AND CHANNEL ESTIMATION

TECHNICAL FIELD

The present invention relates generally to wireless communications and wireless communications-related technology. More specifically, the present invention relates to systems and methods that design a sequence for code modulation of data and channel estimation.

BACKGROUND ART

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmits a reference signal. In addition, wireless communication systems may transmit channel quality information (CQI), acknowledgment reports (ACK) and negative acknowledgment reports (NAK). The CQI and the ACK/NAK may be modulated (or covered) by a sequence that ideally orthogonalizes the CQI and the ACK/NAK. However, covered CQI and ACK/NAK from other systems may introduce interference. As such, benefits may be realized from systems and methods that design a sequence for code modulation of data as well as channel estimation.

Moreover, some conventional arts related to the present invention are disclosed in the following non-patent documents:

Sharp, "Optimized UL RS Design, and some issues with current UL RS proposals", 3GPP TSG-RAN WG1 #48bis R1-071494, Mar. 30, 2007.

Sharp, "Optimized UL RS Design-OZCL Sequences", 3GPP TSG-RAN WG1 #48bis R1-072053, May 11, 2007.

Texas Instruments, "ACK/NAK and CQI Multiplexing and Performance in E-UTRA UL", 3GPP TSG RAN WG1 #49 R1-072206, May 11, 2007.

DILIP V SARWATE, "Bounds on Crosscorrelation and Autocorrelation of Sequences", November 1979, IEEE TRANSACTIONS ON INFORMATION THEORY, VOL. IT-25, NO. 6, pp. 720-724.

DISCLOSURE OF INVENTION

A method for using a numerical method to design a sequence for code modulating data is described. An input multiple input multiple output signal is determined. A nearest tight frame to one or more given structured vectors is obtained. One or more structured vectors is obtained from the nearest tight frame. The one or more structured vectors is projected onto the space of circulant matrices. One or more classes of matrices that indicates the design of the sequence is outputted. Data is code modulated using the designed sequence.

In one embodiment, the data comprises channel quality information. The data may comprise acknowledgement reports and negative acknowledgement reports. The code modulated data may be orthogonal in a cell. In one embodiment, the designed sequence is identical to a sequence used for estimation of a channel.

The data may be code modulated using Code Division Multiple Access (CDMA) implementations. A set of sequences may comprise a Peak to Average Power Ratio that approximates the value of one. The set of sequences may be recursively generated from a base sequence. The code modulated data may be transmitted in a Discrete Fourier Transform Spread Orthogonal Frequency Division Multiplexing system. The designed sequence may be hopped to reduce effects of cross-correlation with one or more additional sequences. The designed sequence may comprise a cyclic shift orthogonal sequence.

A device that is configured to use a numerical method to design a sequence for code modulating data is also described. The device comprises a processor and memory in electronic communication with the processor. Instructions are stored in the memory. An input multiple input multiple output signal is determined. A nearest tight frame to one or more given structured vectors is obtained. One or more structured vectors is obtained from the nearest tight frame. The one or more structured vectors is projected onto the space of circulant matrices. One or more classes of matrices that indicates the design of the sequence is outputted. Data is code modulated using the designed sequence.

A computer-readable medium comprising executable instructions for using a numerical method to design a sequence for code modulating data is also described. An input multiple input multiple output signal is determined. A nearest tight frame to one or more given structured vectors is obtained. One or more structured vectors is obtained from the nearest tight frame. The one or more structured vectors is projected onto the space of circulant matrices. One or more classes of matrices that indicates the design of the sequence is outputted. Data is code modulated using the designed sequence.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In 3GPP Long Term Evolution, channel quality information (CQI), acknowledgment (ACK) reports and negative acknowledgment (NAK) reports may be transmitted from a mobile station (i.e., handset, User Equipment (UE), etc.) to a base station (i.e., node B). A Zadoff-Chu (ZC) sequence, or a similar Constant Amplitude Zero Auto Correlation (CAZAC) sequence, may be used to code division modulate the CQI and the ACK/NAK. The length of the ZC sequence may be twelve or a multiple of twelve.

Reference signals may also be used in communication systems. Reference signals may include a single frequency and are transmitted over the communication systems for supervisory, control, equalization, continuity, synchronization, etc. Communication systems may include one or more mobile stations and one or more base stations that each transmits a reference signal. Reference signals may be used to estimate a channel. As such, the ZC sequence may be referred to as a covering sequence while the reference signal may be referred to as a channel estimation sequence.

In a synchronized system, all mobile stations may send the CQI and the ACK/NAK in a relatively efficient manner. For example, the purpose of the modulation performed by the ZC sequence is to decorrelate (and ideally orthogonalize in a given cell) the CQI and the ACK/NAK information. However, in a synchronized system, many mobile stations may be transmitting at the same time. In one embodiment, twelve mobile stations may be transmitting at the same time in any one cell. Mobile stations from adjacent cells may introduce interference.

If ZC sequences, as described above, are used to cover the CQI and ACK/NAK information, then outside of the shifts of base sequences the only minimally correlated sequences would be those sequences that are relatively prime. For example, if $c_n^{M_1} = \{e^{j2\pi n(n+1)M_1/N}\}$, and $c_n^{M_2} = \{e^{j2\pi n(n+1)M_2/N}\}$ then $<c_n^{M_2}, c_n^{M_1}>$ will be minimally correlated with a correlation of $$\frac{1}{N^{-\frac{1}{2}}}$$

if $M_1$ and $M_2$ are relatively prime to each other. In one embodiment, there are only 48 possible sequences with this property. In addition, Walsh signal sequences are limited as well for code modulating this information.

The present systems and methods describe OZCL sequences that may be used for the purpose of providing an orthogonal cover to CQI and ACK/NACK data. In some versions of 3GPP Long Term Evolution, sequence hopping occurs to randomize the effects of sequence cross-correlation. In a similar manner, the covering sequence designed by the present systems and methods is also hopped to randomize the effects of sequence cross-correlation. In one embodiment, the sequence used for channel estimation, such as a reference signal sequence, would also be the same sequence used for CQI and ACK/NAK covering.

In designing a set of reference signals (or OZCL sequences), certain design considerations may be implemented. For example, the set may be large enough to cover at least three sectors per cell, with at least two reference signals per sector. In one embodiment, four reference signals per sector are present. A further design consideration may be that the set of reference signals may be orthogonal in each sector of a given cell. The set of reference signals may also be orthogonal in all sectors adjacent to a given sector. If the reference signals are orthogonal and the reference signals are known to adjacent sectors, a best minimum mean square receiver may be designed and implemented.

For those reference signals that are not in adjacent sectors, or which are not orthogonal, another design consideration may be that these reference signal are minimally correlated, with approximately the same correlation, and approach (if not meet) the Welch Bound. Sets of sequences that approach or meet the Welch Bound may denote a tight frame, where each vector possesses a unit norm, i.e., $\|\chi_n\|_2 \equiv 1$. A further design consideration is the set of reference signals may also have a Peak to Average Power Ratio (PAPR) that approaches (if not equal) to 1. The PAPR may be defined as, for a sequence vector c as:

$$\mathcal{P} = \frac{\|c\|_\infty^2}{c^H c}, \quad \text{(Equation 1)}$$

where $\|c\|_\infty^2$ denotes the square maximum modulus component of c and where $(\ )^H$ denotes a conjugate transpose.

Another example of a design consideration may be that amongst subsets of sequences with orthogonal elements, each element may be a cyclic shift of another element. This property may be useful to provide robust performance if a transmission system which transmits a cyclic prefix for multipath elimination encounters multipath components with a delay spread greater than the cyclic prefix length. An additional design consideration is that in a system where multiple bandwidths are employed simultaneously, the set of reference signal sequences may be recursively generated from a base sequence.

In one embodiment, the amount of reference signal space (time and frequency resources) may be exactly large enough. For example, the basic unit of bandwidth allocation may allow for 19 or any larger prime number of reference signals available for two reference signals per sector. In a further example, the basic unit of bandwidth allocation may allow for 37 or any larger prime number of reference signals for four reference signals per sector. As in this case, if the amount of reference signal space is exactly large enough, Zadoff-Chu sequences may be taken as the reference sequences as they meet the design considerations previously described. However, such resource availability or sequence numerology may not be plausible. The present systems and methods provide an algorithm for designing reference signals based on alternating projections when such resources or sequence numerology are not available. These same reference signals may also be used to code modulate (or cover) data such as CQI and ACK/NACK information.

BRIEF DESCRIPTION OF DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

BEST MODE FOR CARRYING OUT THE INVENTION

Figure 1:
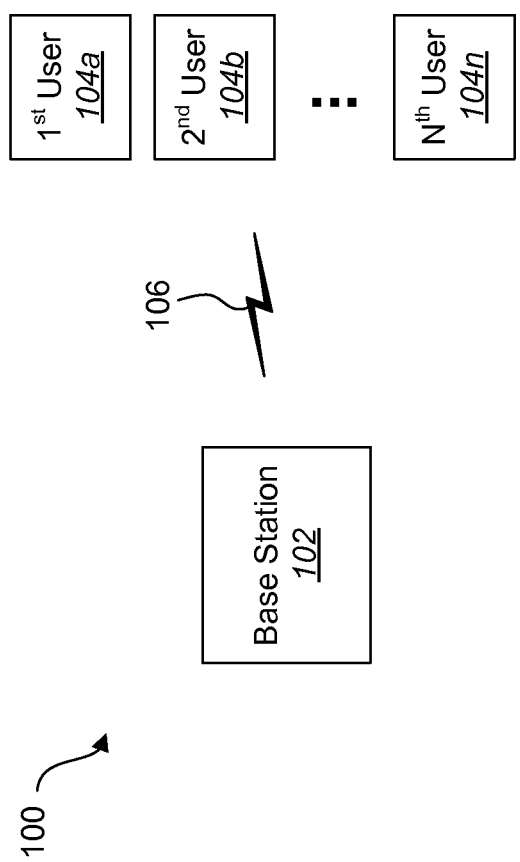
FIG. 1 illustrates an exemplary wireless communication system in which embodiments may be practiced.

FIG. 1 illustrates an exemplary wireless communication system 100 in which embodiments may be practiced. A base station 102 is in wireless communication with a plurality of user devices 104 (which may also be referred to as mobile stations, subscriber units, access terminals, etc.). A first user device 104*a*, a second user device 104*b*, and an Nth user device 104*n* are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
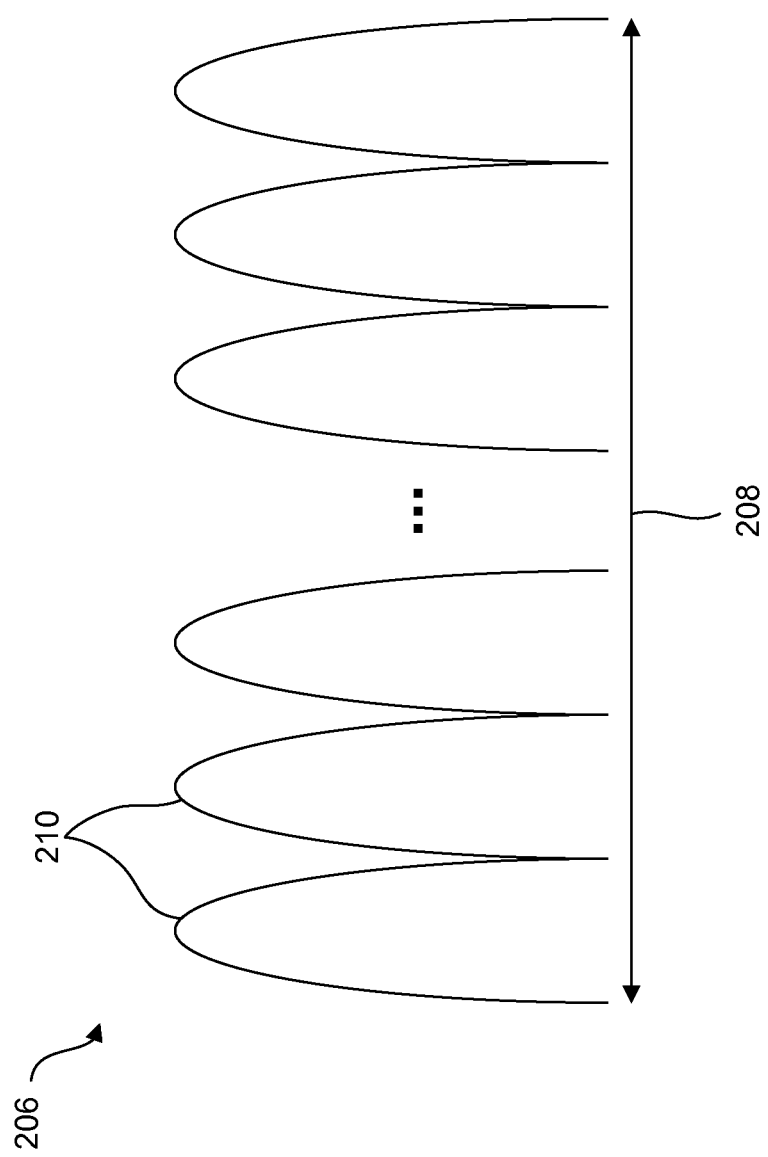
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
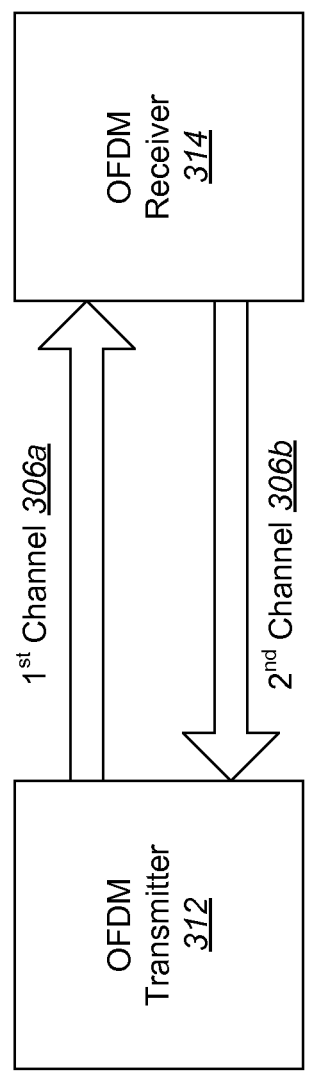
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306*a*. Communication from the OFDM receiver 314 to the OFDM transmitter 312 may occur over a second communication channel 306*b*.

The first communication channel 306*a* and the second communication channel 306*b* may be separate communication channels 306. For example, there may be no overlap between the transmission band of the first communication channel 306*a* and the transmission band of the second communication channel 306*b*.

In addition, the present systems and methods may be implemented with any modulation that utilizes multiple antennas/MIMO transmissions. For example, the present systems and methods may be implemented for MIMO Code Division Multiple Access (CDMA) systems, Time Division Multiple Access (TDMA) systems, Discrete Fourier Transform (DFT) Spread OFDM systems, etc.

Figure 4:
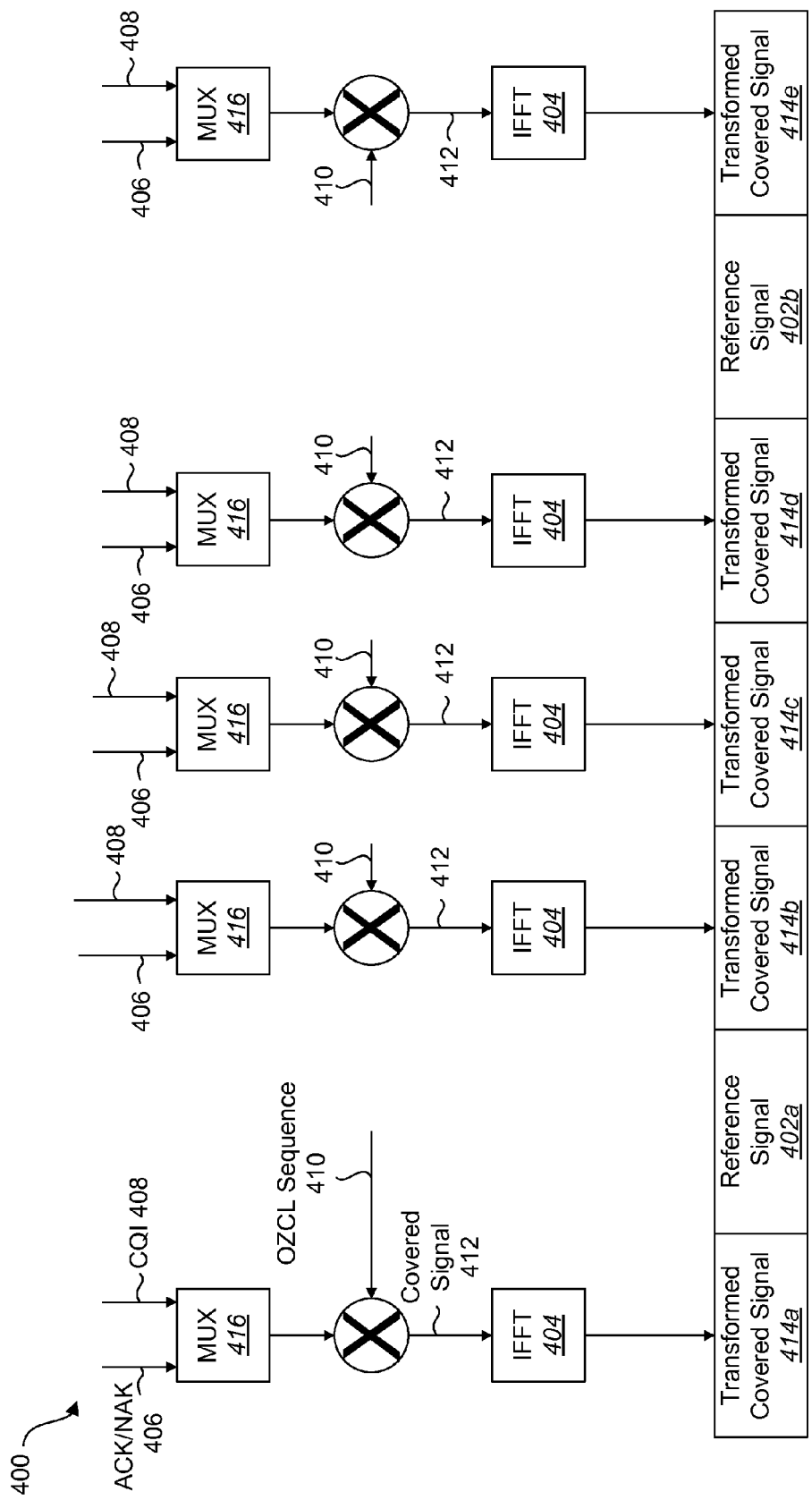
FIG. 4 is a diagram illustrating one embodiment of covering channel quality information (CQI) and acknowledgement and negative acknowledgement reports (ACK/NAK) in accordance with the present systems and methods.

FIG. 4 is a diagram 400 illustrating one embodiment of covering channel quality information (CQI) 408 and acknowledgement and negative acknowledgement reports 406 (ACK/NAK). The CQI 408 provides information relating to the quality of a channel being transmitted and the ACK/NAK reports 406 indicate whether or not a transmission was successfully received. As illustrated, the CQI 408 and the ACK/NAK 406 are multiplexed together. In one embodiment, the multiplexing scheme includes time multiplexing, code multiplexing, superposition multiplexing or some additional multiplexing scheme. A multiplexer (MUX) 416 may implement the multiplexing scheme. The CQI 408 and the ACK/NAK 406 are covered (code modulated) by an Optimized Zadoff-Chu Like (OZCL) sequence 410. In one embodiment, the OZCL sequence 410 covers the CQI 408 and the ACK/NAK 406 under the CDMA standard. In other words, the OZCL sequence 410 code division modulates the CQI 408 and the ACK/NAK 406.

An Inverse Fast Fourier Transform (IFFT) 404 may be applied to a covered signal 412. A transformed covered signal 414 may be transmitted. In one embodiment, the transformed covered signal 414 is transmitted to a base station. In addition, a reference signal 402 may also be transmitted. The reference signal 402 may be a sequence that is used to estimate a channel. In one embodiment, the OZCL sequence 410 and the reference signal 402 are identical. In other words, reference signals 402 used as uplink demodulation reference signals to estimate a channel may also be used to code modulate data, such as the CQI 408 and the ACK/NAK 406. Accordingly, the terms OZCL 410 sequence and reference signal 402 may be used interchangeably. Systems and methods for designing OZCL sequences 410/reference signals 402 are described below. The systems and methods described below design orthogonal (or near orthogonal) sequences that may be implemented in DFT-Spread OFDM systems. In addition, the designed sequences described below may be cyclic shift orthogonal sequences.

Figure 5:
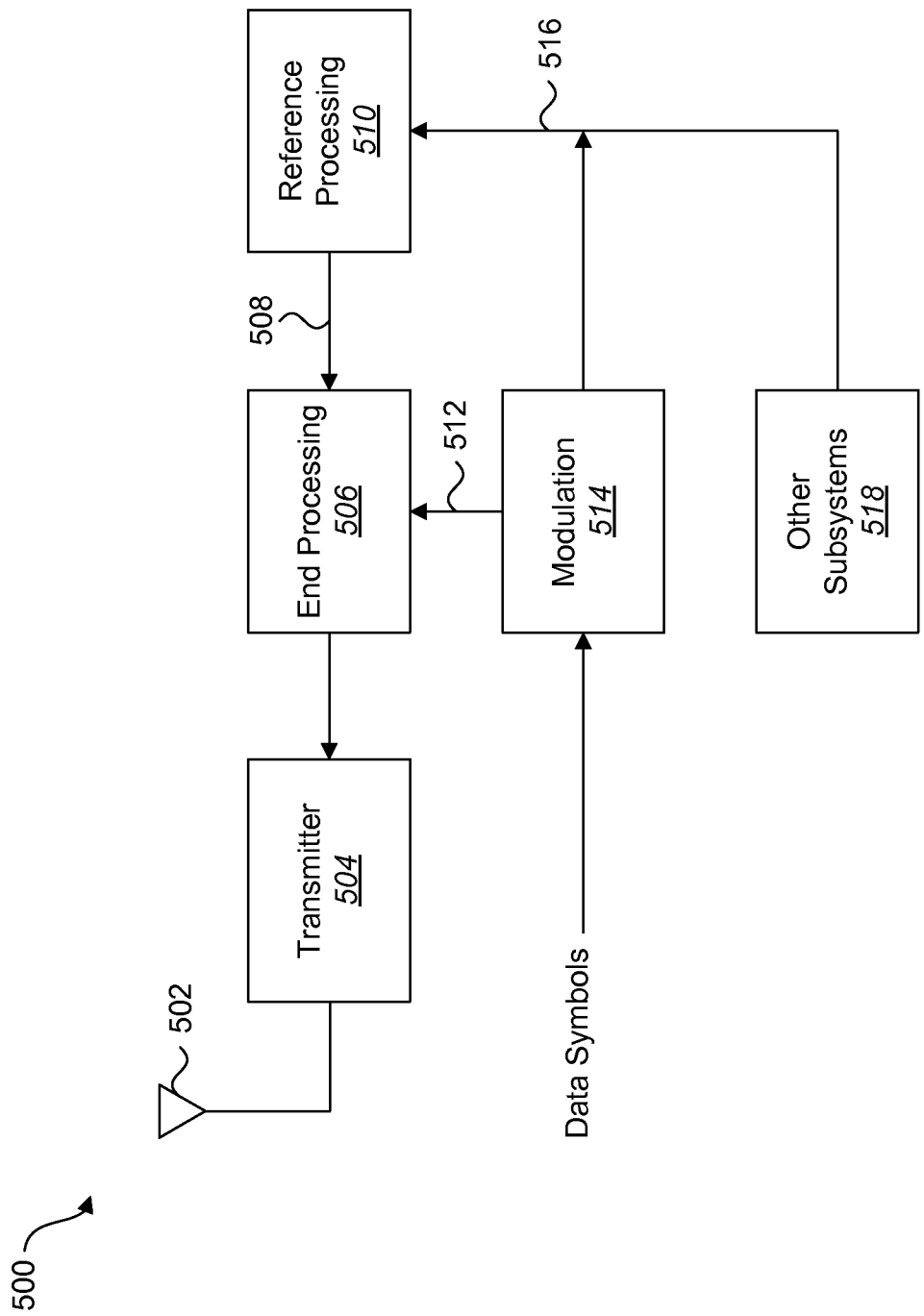
FIG. 5 illustrates a block diagram of certain components in an embodiment of a transmitter.

FIG. 5 illustrates a block diagram 500 of certain components in an embodiment of a transmitter 504. Other components that are typically included in the transmitter 504 may not be illustrated for the purpose of focusing on the novel features of the embodiments herein.

Data symbols may be modulated by a modulation component 514. The modulated data symbols may be analyzed by other subsystems 518. The analyzed data symbols 516 may be provided to a reference processing component 510. The reference processing component 510 may generate a reference signal 508 that may be transmitted with the data symbols. The modulated data symbols 512 and the reference signal 508 may be communicated to an end processing component 506. The end processing component 506 may combine the reference signal 508 and the modulated data symbols 512 into a signal. The transmitter 504 may receive the signal and transmit the signal to a receiver through an antenna 502.

Figure 6:
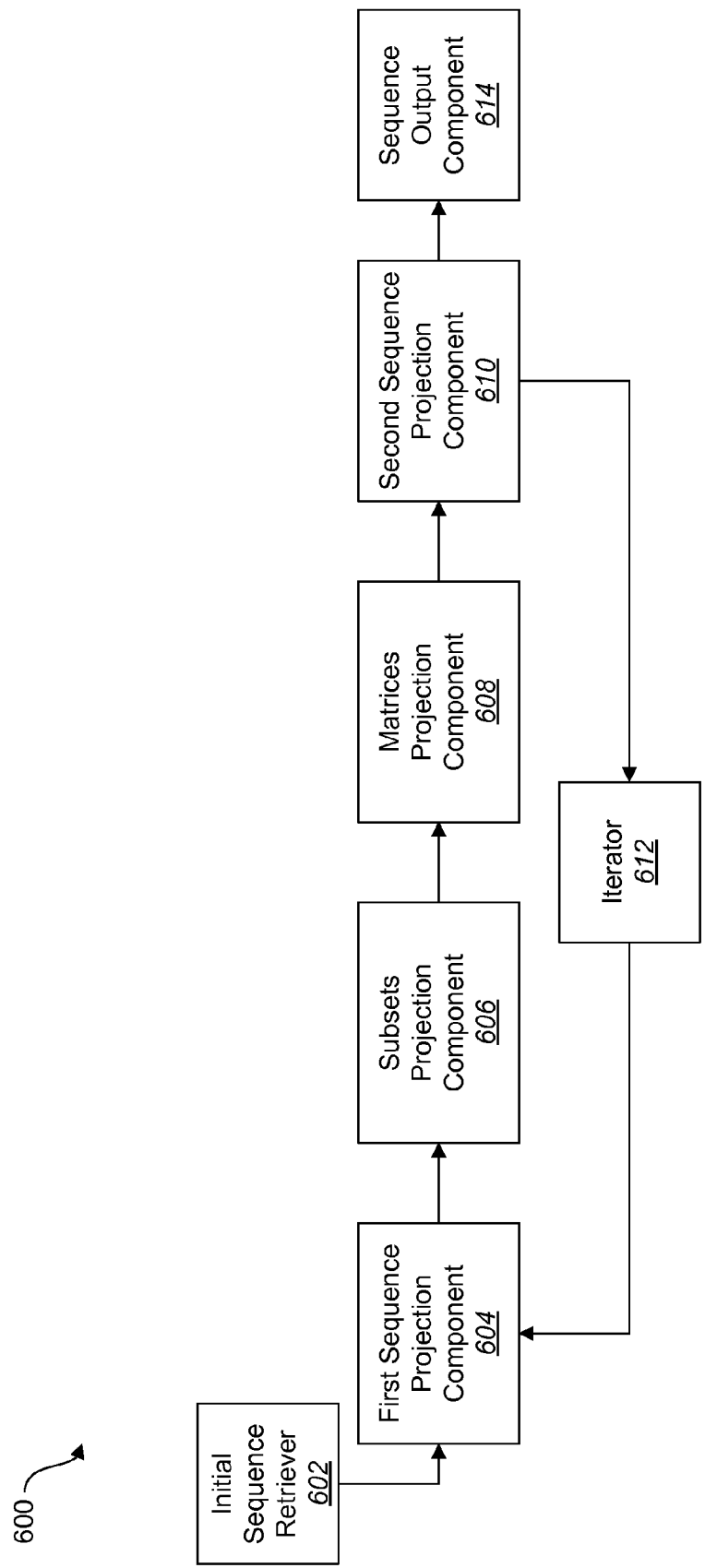
FIG. 6 is a block diagram illustrating one embodiment of components used to design an Optimized Zadoff-Chu Like (OZCL) sequence.

FIG. 6 is a block diagram 600 illustrating one embodiment of components used to design an OZCL sequence 410 used to code modulate data. In one embodiment, an initial sequence retriever 602 may obtain initial sequences. The initial sequences may be set to a first set of sequences. A first sequence projection component 604 may project an obtained sequence set (first set) to a nearest tight frame (or another tight frame). A second set of sequences which comprise a plurality of subsets of sequences is obtained by the projection. A subsets projection component 606 may be implemented to project subsets of the nearest tight frame (subsets of the second set) to one or more orthogonal matrices. A third set of sequences is obtained by the projection. In one embodiment, a matrices projection component 608 may project the one or more orthogonal matrices (third set) to a nearest circulant matrix (or another circulant matrix). A fourth set of sequences is obtained by the projection. In one embodiment, a second sequence projection component 610 may project each of the obtained sequence sets (fourth set) onto a minimum Peak to Average Power Ratio (PAPR) vector (or one of matrices with desired Peak to Average Power Ratio). A fifth set of sequences is obtained by the projection. An iterator 612 may be utilized to set the fifth set to the first set and iterate the steps performed by the first sequence projection component 604, the subsets projection component 606, the matrices projection component 608 and the second sequence projection component 610. The iterator 612 may iterate these steps T time(s) (T is a natural number). A sequence output component (reference signal sequence output section) 614 may output the sequences (fifth set) as base sequences after T iteration(s) have (has) been executed. The sequence output component 614 may output as the OZCL sequences (reference signal sequences) the base sequences (fifth set) which were generated by the preceding steps.

Figure 7:
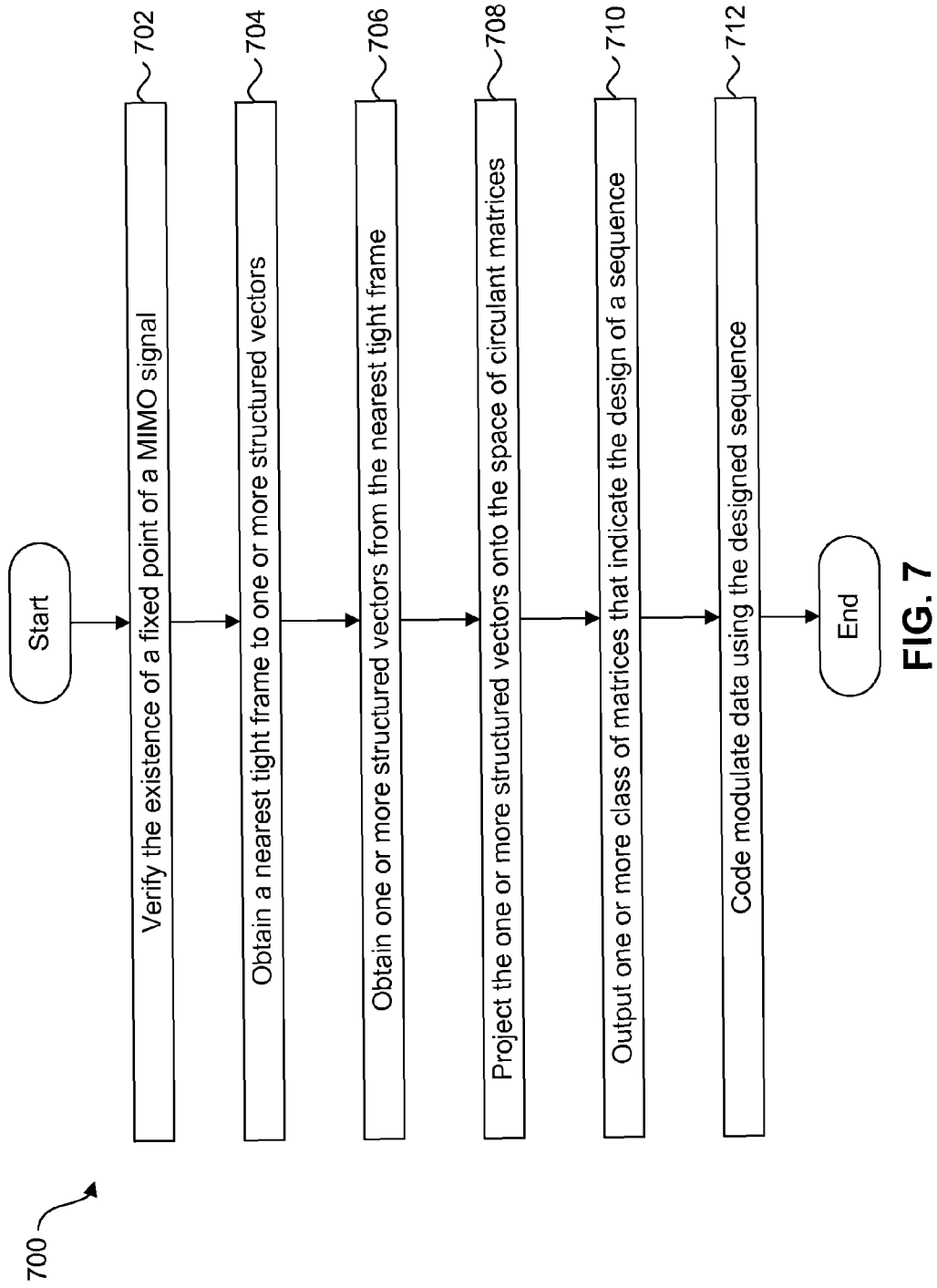
FIG. 7 is a flow diagram illustrating one embodiment of a method for designing an OZCL sequence.

FIG. 7 is a flow diagram illustrating one embodiment of a method 700 for designing an OZCL sequence 410. The method 700 may be implemented by the components discussed previously in regards to FIG. 6. In one embodiment, the existence of a fixed point of a MIMO signal is verified 702. For example, for a set of Zadoff-Chu sequences of lengths 19 or 37, the Zadoff-Chu sequences may be returned and used as an input to design the OZCL sequence 410. A nearest tight frame to one or more structured vectors may be obtained 704. One or more structured vectors may then be obtained 706 from the previously computed nearest tight frame. The one or more structured vectors may be projected 708 onto the space of circulant matrices and one or more classes of matrices may be outputted 710. The outputted matrices may indicate the design of the OZCL sequence 410 used to code modulate 712 data. The design of the sequence may indicate that the OZCL sequence 410 be hopped in order to randomize the effects of sequence cross-correlation. In one embodiment, the data includes the CQI 408 and the ACK/NAK reports 406. Alternatively, the data may include one of the CQI 408 and the ACK/NAK reports (ACK report and/or NAK report) 406. The data may be code modulated 712 following the CDMA standard, by using the OZCL sequence 410. The code modulation may be performed by a processor. The code modulated data may be transmitted in a DFT-Spread OFDM system. The transmission may be performed by a transmitter. The sequence output component 614, the processor, and the transmitter may constitute a communication device that transmits data. The communication device may constitute an user equipment included in a communication system with base stations.

Figure 8:
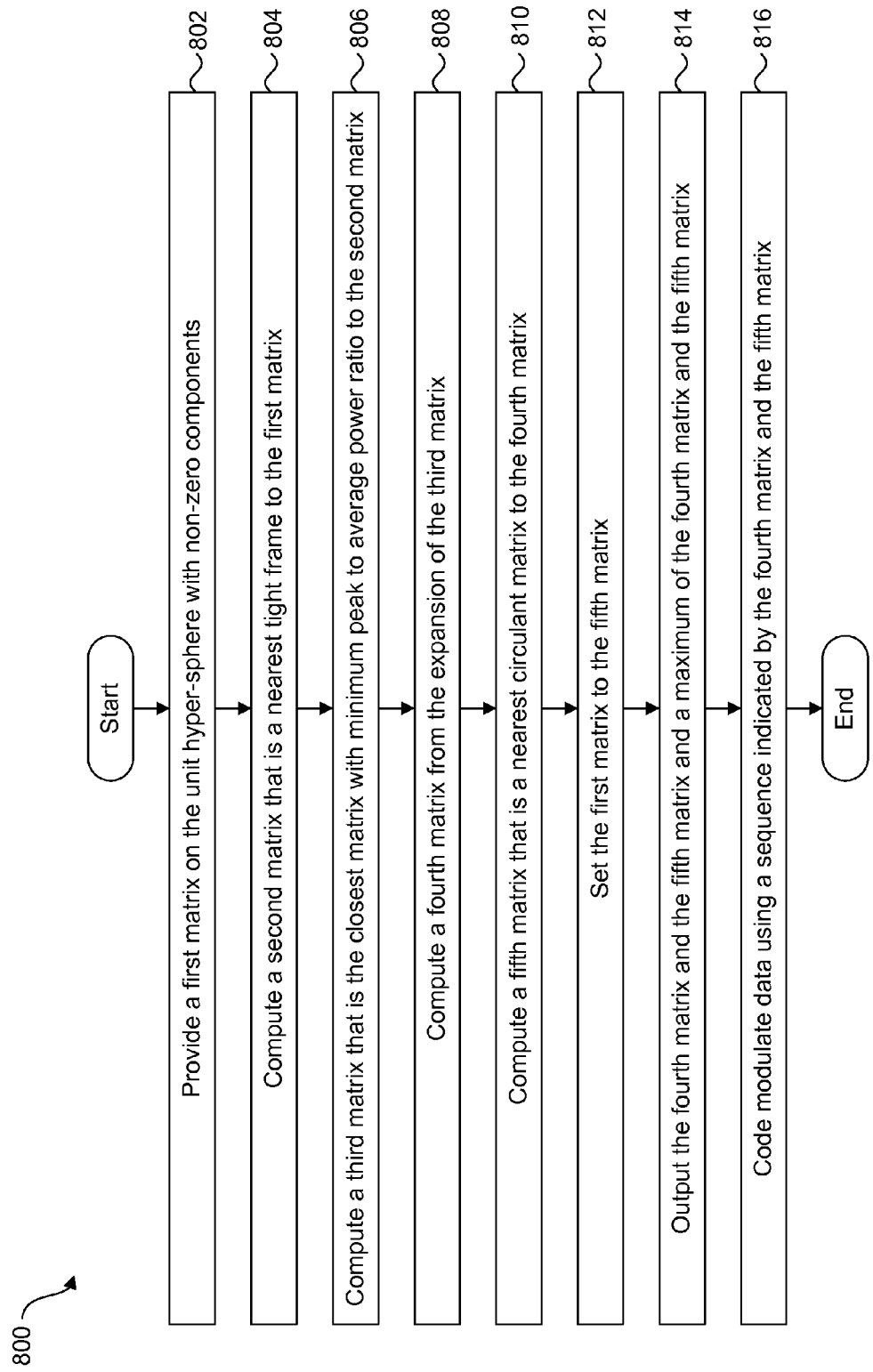
FIG. 8 is a flow diagram illustrating a further embodiment of an algorithm that may be utilized to design an OZCL sequence.

FIG. 8 is a flow diagram 800 illustrating a further embodiment of an algorithm that may be utilized to design a sequence, such as an OZCL sequence 410 or a reference signal 402. As previously mentioned, the reference signal 402 and the OZCL sequence 410 may be identical. In one embodiment, a first matrix is provided 802. The first matrix may be on the unit hyper-sphere. Sequences may be on the unit hyper-sphere to ensure a satisfactory constant envelope property initially. The first matrix may include zero components if the starting sequence is on the unit hyper-sphere. A second matrix may be computed 804. The second matrix may be a nearest tight frame to the first matrix. The nearest tight frame may include an estimation of the first matrix.

In one embodiment, a third matrix may be computed 806. The third matrix may be the closest matrix with a minimum peak to average power ratio to the second matrix. The third matrix may also be expanded and a fourth matrix may be computed 808 from the expansion. In one embodiment, a fifth matrix is computed 810 that is a nearest circulant matrix to the fourth matrix. The first matrix may be set 812 to the fifth matrix. In other words, the first matrix may be assigned the included in the fifth matrix. The fourth matrix and the fifth matrix may be outputted 814. In addition, a maximum inner product of the fourth and fifth matrices may also be outputted 814. The fourth matrix and the fifth matrix may indicate the design of a sequence, such as the OZCL sequence 410. Data may be code modulated 816 using the sequence indicated by the fourth matrix and the fifth matrix. In one embodiment, the data includes the CQI 408 and the ACK/NAK reports 406.

The following may represent steps taken to compute a correlated set of matrices that is the closest matrix with a minimum peak to average power ratio. A sequence of N vectors $$\{x_n\}_{n=1}^{N},$$

$x_n \in \mathcal{C}^d$, $d \leq N$, may be assigned as columns of a matrix $X=[x_1 \ x_2 \ldots x_N]$. The matrix may be referred to as a frame. Each vector may have unit length, without any loss in generality. Block of K of these vectors may be grouped into a set of matrices, $$\{X_i\}_{i=1}^{K}$$

so that (with MK=N) $X=[X_1 \ X_2 \ldots X_M]$. The correlation between vectors may be represented as $\langle x_k, x_n \rangle$ which is the standard inner product in complex Euclidean d-space.

The Welch Bound is, for any frame, for $k \neq n$:

$$\max_{k \neq n} \langle x_k, x_n \rangle \geq \sqrt{\frac{N-d}{d(N-1)}} \quad \text{(Equation 2)}$$

A frame that meets or approaches the Welch Bound may be referred to as a tight frame. The design considerations previously mentioned imply that for any $\langle x_k, x_n \rangle$ not in the same $X_i$, $\langle x_k, x_n \rangle \leq \alpha$, where $\alpha$ is a constant determined by the Welch Bound provided above. If any matrix $Z \in \mathcal{C}^{d \times N}$, is provided, the matrix that comes closest in distance (as measured in element-wise or Frobenius norm) may be given by $\alpha(Z Z^H)^{1/2} Z$. This condition may also enforce an orthnormality condition between rows of X, if an optimal X exists.

The design considerations previously mentioned also imply that $X_i^* X_i = I_K$; (with $K \leq d$). In other words, each column in any $X_i$ may be orthogonal to any other column in $X_i$. The above may be repeated with the role of X above being assumed by $X_i^H$. Further, if as few as two sequences are required per cell (i.e., per matrix $X_i$), a "phase parity check" may be implemented to provide orthogonality between column vectors in $X_i$ when there are zero entries in any column of $X_i$. In other words, the phase of the zero components are chosen such that orthogonality if maintained once each column vector has minimal Peak to Average Power Ratio.

The following may illustrate steps taken to obtain the circulant matrix nearest to a given matrix. A matrix $Z=[z_i \ldots z_N]$, may be provided, where each $z_i$ is a column vector $\in \mathcal{C}^N$. A circulant matrix $C=[c_o \ldots c_{N-1}]$, may be obtained that is closest in Frobenius (element-wise) norm to Z. In one embodiment, F may be given as the Discrete Fourier Transform (DFT) matrix:

$$F = \begin{bmatrix} 1 & 1 & \ldots & 1 \\ 1 & e^{-j2p/N} & \ldots & e^{-j2p(N-1)/N} \\ \vdots & \vdots & \ddots & \vdots \\ 1 & e^{-j2p(N-1)/N} & \ldots & e^{-j2p(N-1)(N-1)/N} \end{bmatrix} \quad \text{(Equation 3)}$$

A diagonal "delay" matrix D may be defined as $D=\text{diag}(1 \ e^{-j2\pi/N} \ e^{-j2\pi 2/N} \ldots e^{-j2\pi(N-1)/N})$. For any circulant matrix C, $C=F^H \Lambda F$, where $\Lambda$ is the DFT of the sequence/vector $c_o$. In addition, it may be shown that $c_{i+1 \mod N} = F^H DF \ c_i = (F^H DF)^{(i+1) \mod N} c_o$. Then $$\|Z - C\|_F^2 = \sum_{i=1}^{N} \|z_i - c_{i-1}\|^2 = \sum_{i=1}^{N} \|z_i - (F^H DF)^{i-1} c_0\|^2.$$

In one embodiment, $$\zeta = \begin{bmatrix} z_1 \\ z_2 \\ \vdots \\ z_n \end{bmatrix}, \text{ and } B = \begin{bmatrix} I_N \\ F^H DF \\ \vdots \\ (F_H DF)^{N-1} \end{bmatrix} \text{ to}$$

minimize $c_o$, which uniquely determines C, $c_o$ is given by $c_o = \beta^+ \zeta$, where $\beta^+$ is the Moore-Penrose pseudo-inverse of $\beta$. In other words, $\beta^+ = (\beta^H \beta)^{-1} \beta^H$.

Matrices where the number of column vectors are not equal to the number of row vectors may be referred to as reduced rank matrices (Z has fewer than N columns). Modifications may be implemented to the recurrence relation $c_{i+1 \mod N} = F^H DF \ c_i$ and the forming of the appropriate matrix $\beta$. If only two vectors were required that were cyclic shifted three elements apart, then $c_1 = (F^H DF)^3 \ c_o$ and $\beta$ may include the matrix elements $I_N$ and $(F^H DF)^2$.

Figure 9:
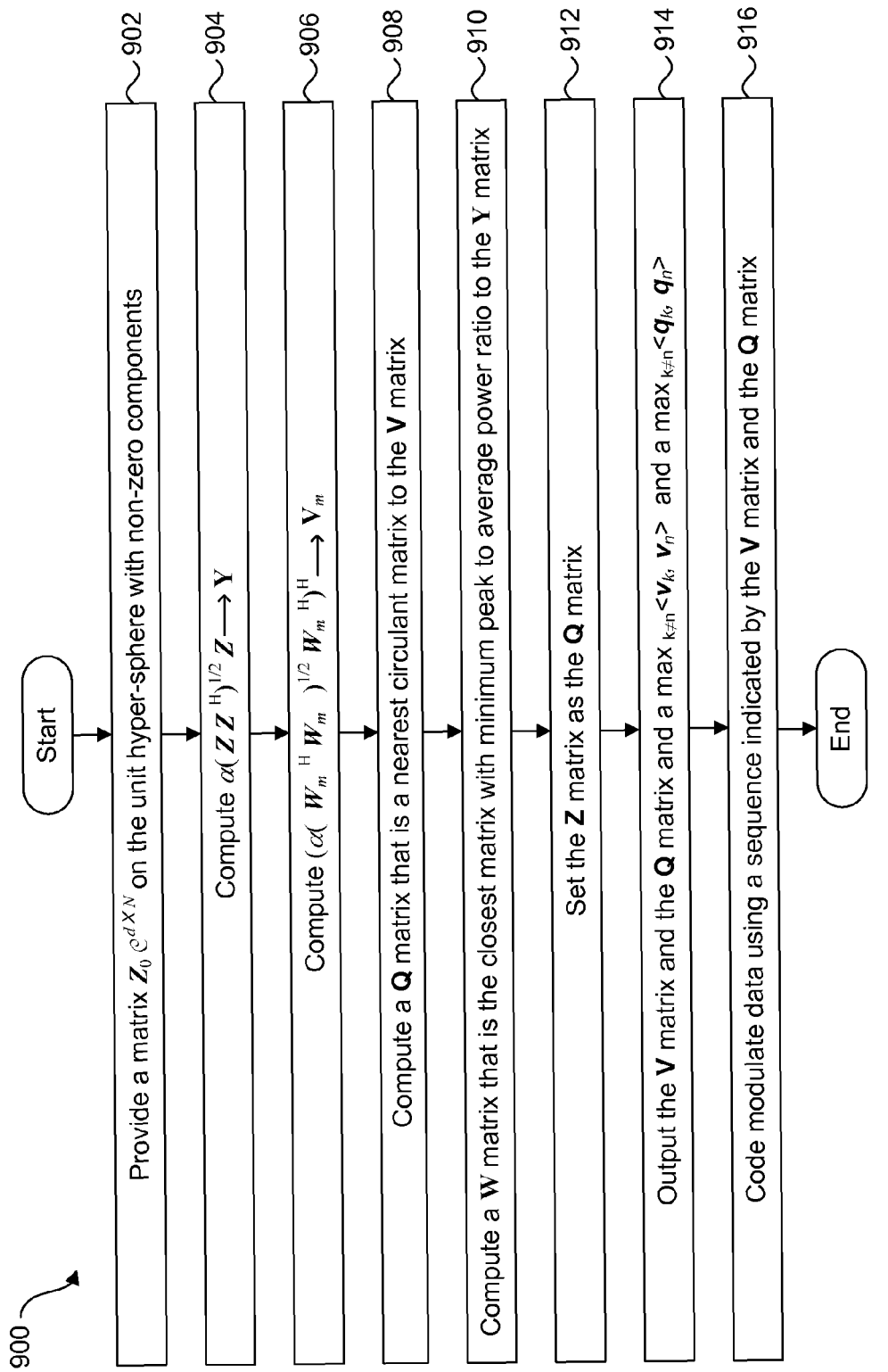
FIG. 9 is a flow diagram illustrating a method of an algorithm that may be utilized to design an OZCL sequence.

FIG. 9 is a flow diagram 900 illustrating a method of an algorithm that may be utilized to design an OZCL sequence 410. A matrix $Z_o \in \mathcal{C}^{d \times N}$, may be provided 902. In one embodiment, the matrix $Z_o$ is on the unit hyper-sphere with all non-zero components. The following may occur for t=1 to T.

In one embodiment, $\alpha(Z \ Z^H)^{1/2} Z$ may be computed 904 and assigned to the matrix Y. This may result in the tight frame nearest to Z. The following constraints may be implemented. If zero entries exist in column vectors of Y, phases to their related components in Y may be added so that orthogonality is maintained. For m=1 to M, $(\alpha(W_m^H W_m)^{1/2} W_m^H)^H$ may be computed 906 and assigned to a vector $V_m$. The matrix $V=[V_1 \ V_2 \ldots V_M]$ may be assembled.

In one embodiment, the $\max_{k \neq n} \langle v_k, v_n \rangle$ may be computed. Further, a Q matrix may be computed 908 that is a nearest circulant matrix to V and $\max_{k \neq n} \langle q_k, q_n \rangle$ may also be computed. A W matrix may be computed 910. The W matrix may be the closest matrix with minimum PAPR to Y. The W matrix may be expressed as $W=[W_1\ W_2\ \ldots\ W_M]$. The Z matrix may be assigned 912 as the Q matrix. If a circulant matrix is not desired, the Z matrix may be assigned as the V matrix. In one embodiment, t is updated as t+1. The V matrix and the Q matrix may be outputted 914. In addition, $\max_{k\neq n}<v_k,v_n>$ and $\max_{k\neq n}<q_k,q_n>$ may also be outputted 914. The V and the Q matrices may indicate the design the OZCL sequence 410. Data may be code modulated 916 using the OZCL sequence 410 indicated by the V matrix and the Q matrix. In one embodiment, the data includes the CQI 408 and the ACK/NAK reports 406.

Figure 10:
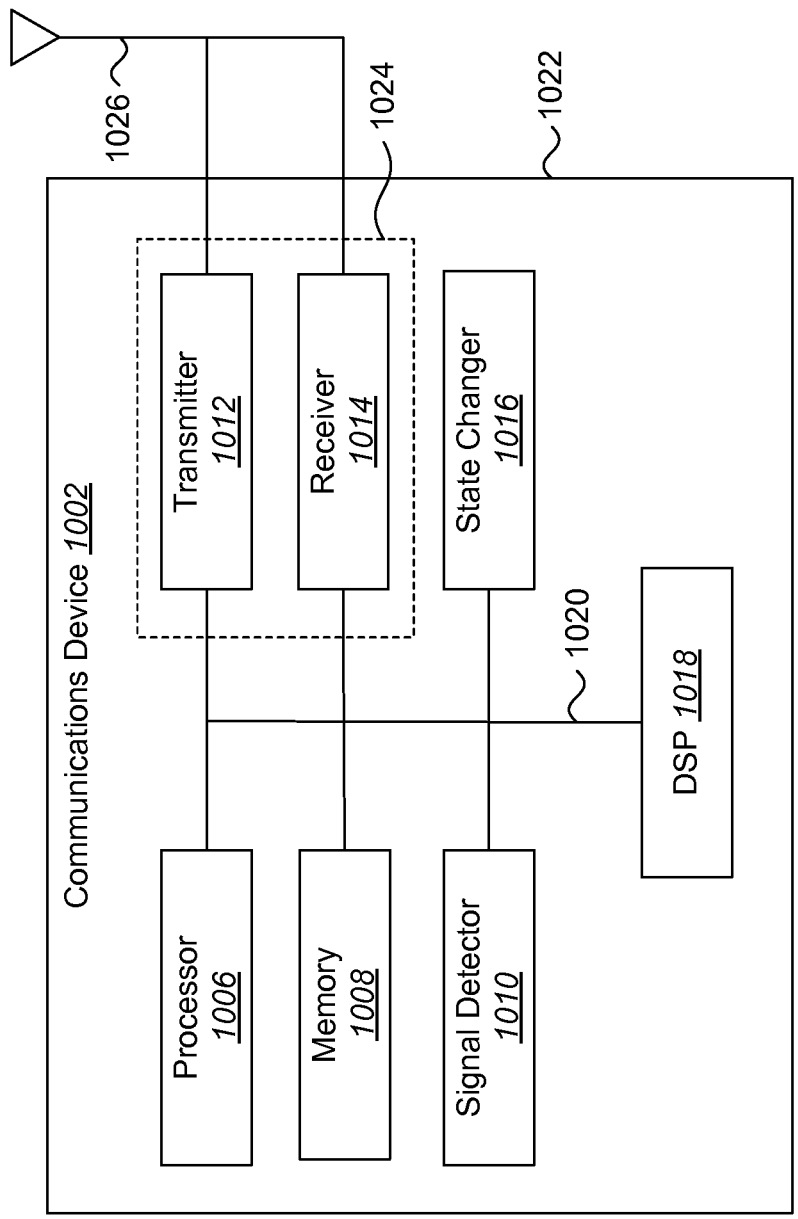
FIG. 10 illustrates various components that may be utilized in a communications device.

FIG. 10 illustrates various components that may be utilized in a communications device 1002. The communications device 1002 may include any type of communications device such as a mobile station, a cell phone, an access terminal, user equipment, a base station transceiver, a base station controller, etc. The communications device 1002 includes a processor 1006 which controls operation of the communications device 1002. The processor 1006 may also be referred to as a CPU. Memory 1008, which may include both read-only memory (ROM) and random access memory (RAM), provides instructions and data to the processor 1006. A portion of the memory 1008 may also include non-volatile random access memory (NVRAM).

The communications device 1002 may also include a housing 1022 that includes a transmitter 1012 and a receiver 1014 to allow transmission and reception of data. The transmitter 1012 and receiver 1014 may be combined into a transceiver 1024. An antenna 1026 is attached to the housing 1022 and electrically coupled to the transceiver 1024. Additional antennas (not shown) may also be used.

The communications device 1002 may also include a signal detector 1010 used to detect and quantify the level of signals received by the transceiver 1024. The signal detector 1010 detects such signals as total energy, pilot energy, power spectral density, and other signals.

A state changer 1016 controls the state of the communications device 1002 based on a current state and additional signals received by the transceiver 1024 and detected by the signal detector 1010. The communications device 1002 may be capable of operating in any one of a number of states.

The various components of the communications device 1002 are coupled together by a bus system 1020 which may include a power bus, a control signal bus, and a status signal bus in addition to a data bus. However, for the sake of clarity, the various buses are illustrated in FIG. 10 as the bus system 1020. The communications device 1002 may also include a digital signal processor (DSP) 1018 for use in processing signals. The communications device 1002 illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. A communication device that transmits data, the communication device comprising;
 a reference signal sequence output section that outputs base sequences as reference signal sequences, wherein the communication device generates the base sequences by:
  1) setting initial sequences to a first set of sequences, and obtaining a second set of sequences by projecting the first set onto a tight frame, the second set comprising a plurality of subsets of sequences;

2) obtaining a third set of sequences by projecting each of the subsets of the second set onto one or more orthogonal matrices;
3) obtaining a fourth set of sequences by projecting the third set onto one of circulant matrices;
4) obtaining a fifth set of sequences by projecting the fourth set onto one of matrices with desired Peak to Average Power Ratio;
5) iterating said steps 1) through 4) at least once by setting the fifth set to the first set;
6) outputting the fifth set as the base sequences after the iteration has been executed;

a processor that modulates data using said reference signal sequence; and a transmitter that transmits said modulated data.

2. A communication device that transmits data, the communication device comprising;
a reference signal sequence output section that outputs reference signal sequences defined by cyclic shifts of base sequences, wherein the communication device generates the base sequences by:
1) setting initial sequences to a first set of sequences, and obtaining a second set of sequences by projecting the first set onto a tight frame, the second set comprising a plurality of subsets of sequences;
2) obtaining a third set of sequences by projecting each of the subsets of the second set onto one or more orthogonal matrices;
3) obtaining a fourth set of sequences by projecting the third set onto one of circulant matrices;
4) obtaining a fifth set of sequences by projecting the forth set onto one of matrices with desired Peak to Average Power Ratio;
5) iterating said steps 1) through 4) at least once by setting the fifth set to the first set;
6) outputting the fifth set as the base sequences after iteration have been executed;

a processor that modulates data using said reference signal sequence; and a transmitter that transmits said data thus modulated.

3. The communication device of claim 1, wherein the data comprises at least one of channel quality information, acknowledgement report, and negative acknowledgement report.

4. The communication device of claim 2, wherein the data comprises at least one of channel quality information, acknowledgement report, and negative acknowledgement report.

5. An user equipment included in a communication system with base stations, the user equipment comprising said communication device of claim 1.

6. An user equipment included in a communication system with base stations, the user equipment comprising said communication device of claim 2.

7. The communication device of claim 3, serving as a mobile station included in a communication system with base stations.

8. The communication device of claim 4, serving as a mobile station included in a communication system with base stations.

* * * * *